United States Patent [19]

Boroschewski et al.

[11] 4,065,293
[45] Dec. 27, 1977

[54] METHOD FOR CONTROLLING THE GROWTH OF WEEDS IN A FIELD CONTAINING GROWING PLANTS OF COTTON

[75] Inventors: Gerhard Boroschewski; Friedrich Arndt, both of Berlin, Germany

[73] Assignee: Schering Aktiengesellschaft, Berlin & Bergkamen, Germany

[21] Appl. No.: 739,154

[22] Filed: Nov. 4, 1976

Related U.S. Application Data

[63] Continuation of Ser. No. 610,908, Sept. 5, 1975, abandoned, which is a continuation of Ser. No. 444,408, Feb. 21, 1974, abandoned.

[30] Foreign Application Priority Data

Mar. 1, 1973 Germany ............................ 2310648

[51] Int. Cl.$^2$ ............................................. A01N 9/12
[52] U.S. Cl. ................................ 71/100; 260/455 A; 71/111; 560/29
[58] Field of Search ........................................... 71/100

[56] References Cited

U.S. PATENT DOCUMENTS 3,404,975  10/1968  Wilson et al. ........................... 71/100
3,701,646  10/1972  Neighbors ............................... 71/100

*Primary Examiner*—Joseph Paul Brust
*Attorney, Agent, or Firm*—Joseph F. Padlon

[57] ABSTRACT

Alkyl N-3-carbamoyloxyphenyl-carbamates of the formula

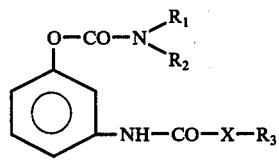

selectively damage or destroy weeds in crops of carrots, cotton, peanuts, and rice without damaging the crop plants when $R_1$ is lower alkyl, allyl, or halo-lower-alkyl; $R_2$ is lower alkyl, allyl, halo-lower alkyl, lower alkinyl, cyclohexyl, benzyl, or phenylethyl; $R_3$ is methyl and ethyl; and X is oxygen or sulfur. Lower alkyl and lower alkinyl in the formula have up to four carbon atoms.

4 Claims, No Drawings

METHOD FOR CONTROLLING THE GROWTH OF WEEDS IN A FIELD CONTAINING GROWING PLANTS OF COTTON

This application is a continuation of application Ser. No. 610,908, filed Sept. 5, 1975, now abandoned, which in turn is a continuation of Ser. No. 444,408, filed Feb. 21, 1974, now abandoned.

The invention relates to selective herbicides and particularly to alkyl N-3-carbamoyloxyphenyl-carbamates and a method of using the same.

The known herbicides which are alkyl N-3-carbamoyloxyphenylcarbamates are effective in controlling weeds in crops of sugar beets and other economically less important crops, but they damage cotton plants severely when employed in amounts effective to destroy the weeds.

The object of this invention is the provision of herbicides which can be used to advantage in cotton crops to control weeds without damaging the crop plants.

It has been found that compounds of the formula

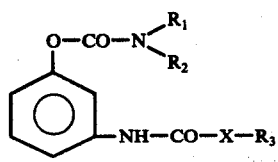

selectively control weeds in crops of cotton, but also in carrots, peanuts, and rice, without doing significant damage to the crop plants when $R_1$ is lower alkyl, allyl, or halo-lower-alkyl; $R_2$ is lower alkyl, allyl, halo-lower-alkyl, lower alkinyl, cyclohexyl, benzyl, or phenylethyl; $R_3$ is methyl or ethyl; and X is oxygen or sulfur, the term "lower alkyl" and its analogs being employed in this specification to embrace radicals having up to four carbon atoms.

The compounds of the invention differ from known, chemically related herbicides by being well tolerated by cotton plants in all stages of development, even by cotton seedlings. The compounds may thus be applied to weeds intermingled with the cotton plants at any stage of cultivation, and it is not necessary to postpone treatment until the cotton plants have matured, permitting a corresponding growth of weeds, as was necessary heretofore.

When the compounds of the invention are applied to cotton fields in the post-emergence stage of the cotton plants, they not only damage or destroy the weeds above ground but also act on germinating weed seeds which have not yet emerged.

The compounds of the invention are also effective in an analogous manner in crops of carrots, peanuts, and rice. They destroy or damage a wide variety of weeds including *Setaria verticillata, Amarantus spinosus, Datura stramonium, Portulaca oleracea, Xanthium pensylvanicum, Eleusine indica, Rottboellia exaltata, Sinapis sp., Solanum sp., Stellaria media, Senecio vulgaris, Lamium amplexicaule, Centaurea cyanus, Amarantus retroflexus, Galium aparine, Chrysanthemum segetum, Echinochloa crus galli, Setaria italica, Ipomoea purpurea, Polygonum lapathifolium, Digitaria sanguinalis*, and *Setaria faberi.*

The normal rate of application for selective effects on weeds is generally 1 kg to 3 kg of active compound per hectare, but application rates as high as 10 kg/ha may be employed if necessary without major crop damage.

Each compound of the invention may be employed as the sole active ingredient of a herbicidal composition, but the compounds may also be applied jointly with each other and with other herbicides and addition agents not having herbicidal effects of their own. Surfactants synergistically enhance the selective herbicidal effects of the compounds of the invention in a manner known in itself.

The compounds are applied to weeds and crop plants in a conventional manner and are normally diluted with inert carriers for ease of handling. The compositions so obtained may be pulverulent or granular solids or liquids in which the compounds of the invention are dissolved in organic solvents or dispersed as a separate phase in a liquid carrier in which they are not adequately soluble. Calcium lignosulfonate, polyoxyethylene-octylphenol ethers, naphthalenesulfonic acids, phenolsulfonic acids, formaldehyde condensation products, fatty alcohol sulfates, and the alkali and alkaline earth salts of fatty acids may be employed to enhance the wetting of the weeds by liquid compositions and to improve the selective herbicidal effect, particularly when the surfactants are employed in amounts greater than those needed for producing a maximum reduction of surface tension.

The active agents of the invention are most conveniently applied in the form of compositions in which they are mixed with inert liquid or solid carriers in rations of 4:1 to 1:4, and the mixtures may contain up to 30% surfactant.

The mode of application may be chosen to suit conditions as is well known. Aqueous compositions containing the necessary amount of at least one active agent of the invention may be sprayed on the weed-infested crops in amounts of 100 liter/ha to 1000 liter/ha, these application rates being merely typical and not critical.

The compounds of the invention are prepared by known reactions as by reacting compounds of the formulas

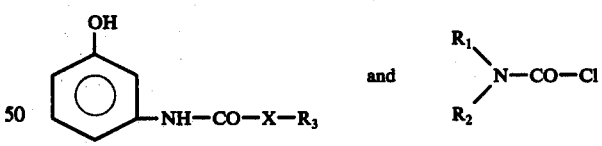

with each other in the presence of triethylamine or pyridine at 0° to 100° C.

They may also be prepared by reacting an amine of the formula $R_1 - NH - R_2$ with a compound of the formula

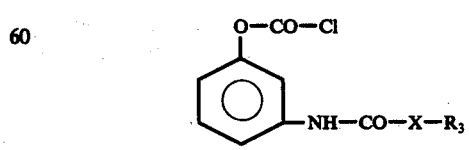

in the presence of an acid acceptor.

Another synthesis starts from compounds of the formula

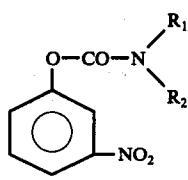

which are hydrogenated in methanol solution in the presence a Raney nickel catalyst, and the amines so obtained are reacted with compounds of the formula $R_3 - X - CO - Cl$, in all the above formulas $R_1$, $R_2$, $R_3$, and X being as defined initially.

The following Examples illustrate the preparation of compounds of this invention and their use.

EXAMPLE 1

A solution of 14.6 g 3-N-carbethoxyamino-phenyl chloroformic acid ester in 30 ml ethyl acetate and a solution of 8.3 g potassium carbonate in 30 ml water were added dropwise and simultaneously with stirring to a mixture of 5.3 g N-ethylisopropylamine, 50 ml water, and 30 ml ethyl acetate at 10° to 15° C. Stirring was continued 30 minutes while the reaction mixture was cooled with ice. The organic phase was separated from the aqueous phase, washed at 0° C with a little dilute sodium hydroxide solution and with water, dried with desiccated magnesium sulfate, and partly evaporated in a vacuum. The residue was mixed with pentane and cooled with ice, whereby 14.1 g ethyl N-3-(N-ethyl-N-isopropylcarbamoyloxy)-phenyl-carbamate was precipitated in crystalline form (80% yield). The compound will be referred to hereinafter as Compound No. 1. It melts at 65° to 66° C.

EXAMPLE 2

A solution of 16.7 g 3-hydroxycarbanilic acid methyl ester and 19.6 g N,N-dipropylcarbamoyl chloride in about 50 ml anhydrous pyridine was heated 45 minutes at 90° C in a water bath. The solvent was evaporated in a vacuum, the residue was dissolved in ethyl acetate, and the solution was washed with a little dilute sodium hydroxide solution, with dilute hydrochloric acid, and with water at 0° C, dried with magnesium sulfate, and evaporated in a vacuum. When pentane was added to the residue, ethyl N-3-(N,N-dipropylcarbamoyloxy)-phenyl-carbamate (Compound 2) crystallized. When recrystallized from tetrahydrofurane and pentane, it melted at 82° – 84° C. The yield was 21.0 g (68%).

The Compounds Nos. 3 to 73 listed in the attached Table I were prepared by the methods described above. They are readily soluble in acetone, cyclohexanone, ethyl acetate, isophorone, ethyl ether, and tetrahydrofurane, but are practically insoluble in water and petroleum ether. Compounds Nos. 2, 14, 15, 16, 17, 21, 23, 28, 30, and 34 are outstanding in their herbicidal effects against weeds without affecting cotton, carrot, peanut, and rice crops.

EXAMPLE 3

The crop plants and weeds listed in Table II were sprayed in a greenhouse test at an early stage of post-emergence development with emulsions, each essentially consisting of 3 kg herbicidal compound and 500 liters water per hectare. The plants were inspected 14 days after the spraying, and the herbicidal effects were evaluated according to an empirical, but reproducible numerical scale on which 0 stands for total destruction, and 10 for absence of damage. The results are so listed in the Table.

The tests covered most of the compounds listed in Table I. In comparison tests under otherwise identical conditions, N-(3-trifluoromethylphenyl)-N,N-dimethylurea completely destroyed most of the same weeds together with carrots and rice, and almost completely destroyed cotton and peanut plants. Another known herbicide, methyl N-[3-(N-3-methylphenylcarbamoyloxy)-phenyl]-carbamate destroyed many weeds, almost destroyed others as well as cotton, severely damaged carrots, and caused some damage to peanuts. The much better selectivity of the compounds of the invention is evident from Table II.

The crop plants and weeds are identified in all Tables by capital letters as follows:
CA: Carrot
CO: Cotton
PE: Peanut
PO: Potato
RI: Rice
PL: Polygonum lapathifolium
SM: Stellaria media
LA: Lamium amplexicaule
CC: Centaurea cyanus
AR: Amarantus retroflexus
CS: Chrysanthemum segetum
IP: Ipomoea purpurea
EC: Echinochloa crus galli
SI: Setaria italica
DS: Digitaria sanguinalis
SF: Setaria faberi
AS: Marantus spinosum
XP: Xanthium pensilvanicum
PR: Portulaca oleracea
SV: Setaria verticillata
RE: Rottboellia exaltata
EI: Eleusine indica

EXAMPLE 4

The crop plants and weeds listed in Table III were treated in the pre-emergence stage with the indicated herbicides of the invention at the same rate as in Example 3, and the results achieved were evaluated on the same numerical scale after 14 days and are listed in Table III.

In a comparison test, methyl N-[3-(N-3-methylphenyl-carbamoyloxy)-phenyl]-carbamate did not damage the crop plants nor the weeds under the same conditions.

EXAMPLE 5

Young plants of the weeds listed in Table IV were sprayed in a greenhouse with emulsions of 2 kg active agent in 500 liter water per hectare, and the effects on the weeds were evaluated after 14 days as in the preceding Examples. The results listed in the Table show the full effectiveness of the tested compounds at the lower application rate.

TABLE I

| Comp'd No. | | M.P.° C or $n_D^{20}$ |
|---|---|---|
| 3 | Methyl N-3-(N-ethyl-N-benzylcarbamoyloxy)-phenyl-carbamate | 97 – 38 |
| 4 | S-Methyl N-3-(N-ethyl-N-benzylcarbamoyloxy)-phenyl-thiocarbamate | 108 – 111 |
| 5 | Ethyl N-3-(N-ethyl-N-benzylcarbamoyloxy)-phenyl-carbamate | 93 – 94 |
| 6 | Methyl N-3-(N-methyl-N-2-phenylethyl-carbamoyloxy)-phenyl-carbamate | 88 – 90 |
| 7 | S-Methyl N-3-(N-butyl-N-benzylcarbamoyloxy)-phenyl-thiocarbamate | 82 – 84 |
| 8 | Ethyl N-3-(N-methyl-N-benzylcarbamoyloxy)-phenyl-carbamate | 83 – 85 |
| 9 | S-Methyl N-3-(N-methyl-N-benzylcarbamoyloxy)-phenyl-thiocarbamate | 83 – 85 |
| 10 | Methyl N-3-(N-butyl-N-benzylcarbamoyloxy)-phenyl-carbamate | 57 – 61 |
| 11 | Methyl N-3-(N-methyl-N-benzylcarbamoyloxy)-phenyl-carbamate | 79 – 82 |
| 12 | Ethyl N-3-(N-methyl-N-2-phenylethyl-carbamoyloxy)-phenyl-carbamate | 101 – 103 |
| 13 | S-Methyl N-3-(N-methyl-N-2-phenylethyl-carbamoyloxy)-phenyl-thiocarbamate | 69 – 72 |
| 14 | Methyl N-3-(N,N-bis-2-chloroethyl-carbamoyloxy)-phenyl-carbamate | 58 – 61 |
| 15 | Ethyl N-3-(N,N-bis-2-chloroethyl-carbamoyloxy)-phenyl-carbamate | 69 – 72 |
| 16 | S-Methyl N-3-(N,N-dipropylcarbamoyloxy)-phenyl-thiocarbamate | 92 – 93 |
| 17 | S-Methyl N-3-(N-ethyl-N-butylcarbamoyloxy)-phenyl-thiocarbamate | 98 – 100 |
| 18 | S-Methyl N-3-(N,N-di-isobutylcarbamoyloxy)-phenyl-thiocarbamate | 117 – 110 |
| 19 | S-Methyl N-3-(N,N-dibutylcarbamoyloxy)-phenyl-thiocarbamate | 57 – 58 |
| 20 | S-Methyl N-3-(N-ethyl-N-isopropylcarbamoyloxy)-phenyl-thiocarbamate | 124 – 126 |
| 21 | S-Methyl N-3-(N-methyl-N-cyclohexylcarbamoyloxy)-phenyl-thiocarbamate | 110 – 113 |
| 22 | S-Methyl N-3-(N-ethyl-N-cyclohexylcarbamoyloxy)-phenyl-thiocarbamate | 155 – 156 |
| 23 | S-Methyl N-3-(N,N-bis-2-chloroethylcarbamoyloxy)-phenyl-thiocarbamate | 104 – 106 |
| 24 | S-Methyl N-3-(N-N-diallylcarbamoyloxy)-phenyl-thiocarbamate | 67 – 70 |
| 25 | S-Methyl N-3-(N,N-di-isopropylcarbamoyloxy)-phenyl-thiocarbamate | 177 – 178 |
| 26 | Methyl N-3-(N-propyl-N-cyclohexylcarbamoyloxy)-phenyl-carbamate | 102 – 103.5 |
| 27 | Methyl N-3-(N-isobutyl-N-cyclohexylcarbamoyloxy)-phenyl-carbamate | 105.5 – 107 |
| 28 | Methyl N-3-(N,N-dipropylcarbamoyloxy)-phenyl-carbamate | 68 – 69 |
| 29 | Methyl N-3-(N-ethyl-N-butyl-carbamoyloxy)-phenyl-carbamate | 69 – 71 |
| 30 | Methyl N-3-(N-ethyl-N-isopropyl-carbamoyloxy)-phenyl-carbamate | 93 – 95 |
| 31 | Methyl N-3-(N,N-diallylcarbamoyloxy)-phenyl-carbamate | 46 – 48 |
| 32 | Ethyl N-3-(N-ethyl-N-butylcarbamoyloxy)-phenyl-carbamate | 57 – 59 |
| 33 | Ethyl N-3-(N,N-diallylcarbamoyloxy)-phenyl-carbamate | 1.5250 |
| 34 | Methyl N-3-(N-methyl-N-cyclohexylcarbamoyloxy)-phenyl-carbamate | 120 – 121 |
| 35 | Ethyl N-3-(N-methyl-N-cyclohexylcarbamoyloxy)-phenyl-carbamate | 77 – 79 |
| 37 | Ethyl N-3-(N-cyclohexyl-N-propyl-carbamoyloxy)-phenyl-carbamate | 91 – 95 |
| 38 | Ethyl N-3-(N-cyclohexyl-N-isopropyl-carbamoyloxy)-phenyl-carbamate | 134 – 137 |
| 39 | Methyl N-3-(N-cyclohexyl-N-isopropyl-carbamoyloxy)-phenyl-carbamate | 128 – 130 |
| 40 | S-Methyl N-3-(N-cyclohexyl-N-propyl-carbamoyloxy)-phenyl-thiocarbamate | 116 – 119 |
| 41 | Ethyl N-3-(N-butyl-N-cyclohexyl-carbamoyloxy)-phenyl-carbamate | 89 – 93 |
| 42 | Methyl N-3-(N,N-butyl-N-cyclohexyl-carbamoyloxy)-phenyl-carbamate | 1.5140 |
| 43 | S-Methyl N-3-(N-cyclohexyl-N-isobutylcarbamoyloxy)-phenyl-thiocarbamate | 117 – 119 |
| 44 | Ethyl N-3-(N-cyclohexyl-N-sec.-butyl-carbamoyloxy)-phenyl-carbamate | 98 – 100 |
| 45 | Methyl N-3-(N-cyclohexyl-N-sec.-butyl-carbamoyloxy)-phenyl-carbamate | 106 – 107 |
| 46 | Methyl N-3-(N-1-methyl-2-propinyl)-N-methyl-carbamoyloxy)-phenyl-carbamate | 115 – 117 |
| 47 | Ethyl N-3-(N-isobutyl-N-cyclohexyl-carbamoyloxy)-phenyl-carbamate | 1.5210 |
| 48 | S-Ethyl N-3-(N-ethyl-N-benzyl-carbamoyloxy)-phenyl-thiocarbamate | 86 – 89 |
| 49 | S-Ethyl N-3-(N-cyclohexyl-N-methyl-carbamoyloxy)-phenyl-thiocarbamate | 144 – 146 |
| 50 | S-Ethyl N-3-(N,N-diallylcarbamoyloxy)-phenyl-thiocarbamate | 48 – 52 |
| 51 | S-Ethyl N-3-(N-ethyl-N-isopropyl-carbamoyloxy)-phenyl-thiocarbamate | 95 – 96 |
| 52 | S-Ethyl N-3-(N-ethyl-N-butylcarbamoyloxy)-phenyl-thiocarbamate | 1.5445 |
| 53 | S-Ethyl N-3-(N,N-bis-2-chloroethyl-carbamoyloxy)-phenyl-thiocarbamate | 100 – 102 |
| 54 | S-Ethyl N-3-(N-butyl-N-cyclohexyl-carbamoyloxy)-phenyl-thiocarbamate | 122 – 124 |
| 55 | S-Ethyl N-3-(N-cyclohexyl-N-isobutyl-carbamoyloxy)-phenyl-thiocarbamate | 140 – 142 |
| 56 | S-Ethyl N-3-(N-sec.butyl-N-cyclohexyl-carbamoyloxy)-phenyl-thiocarbamate | 130 – 132 |
| 57 | Methyl N-3-(N-ethyl-N-2-chloroethyl-carbamoyloxy)-phenyl-carbamate | 100 – 102 |
| 58 | Ethyl N-3-(N-ethyl-N-2-chloroethyl-carbamoyloxy)-phenyl-carbamate | 96 – 98 |
| 59 | Ethyl N-3-(N-methyl-N-2-chloroethyl-carbamoyloxy)-phenyl-carbamate | 86 – 88 |
| 60 | S-Ethyl N-3-(N-benzyl-N-methyl-carbamoyloxy)-phenyl-thiocarbamate | 68 – 70 |
| 61 | S-Ethyl N-3-(N-methyl-N-2-phenylethyl-carbamoyloxy)-phenyl-thiocarbamate | 84 – 87 |
| 62 | S-Ethyl N-3-(N-diethyl-carbamoyloxy)-phenyl-thiocarbamate | 83 – 84 |
| 63 | S-Methyl N-3-(N-methyl-N-2-chloroethyl-carbamoyloxy)-phenyl-thiocarbamate | 90 – 92 |
| 64 | S-Ethyl N-3-(N-ethyl-N-2-chloroethyl-carbamoyloxy)-phenyl-thiocarbamate | 83 – 85 |
| 65 | S-Ethyl N-3-(N-methyl-N-2-chloroethyl-carbamoyloxy)-phenyl-thiocarbamate | 86 – 88 |
| 66 | S-Ethyl N-3-(N-dibutyl-carbamoyloxy)-phenyl-thiocarbamate | 1.5250 |
| 67 | Methyl N-3-(N-allyl-N-cyclohexyl-carbamoyloxy)-phenyl-carbamate | 99 – 101 |
| 68 | Methyl N-3-(N-ethyl-N-2-bromoethyl-carbamoyloxy)-phenyl-carbamate | 117 |
| 69 | Methyl N-3-(N-butyl-N-tert.-butyl-carbamoyloxy)-phenyl-carbamate | 59 – 62 |
| 70 | Ethyl N-3-(N-ethyl-N-2-bromoethyl-carbamoyloxy)-phenyl-carbamate | 110 |
| 71 | S-Methyl N-3-(N-ethyl-N-2-chloroethyl-carbamoyloxy)-phenyl-thiocarbamate | 98 – 100 |
| 72 | Methyl N-3-(N-methyl-N-2-chloroethyl-carbamoyloxy)-phenyl-carbamate | 103 – 104 |
| 73 | S-Ethyl N-3-(N,N-dipropyl-carbamoyloxy)-phenyl-thiocarbamate | 73 – 74 |

TABLE II

| Comp'd No. | CA | CO | PE | RI | PL | SM | LA | CC | AR | IP | EC | SI | DS | SF |
|---|---|---|---|---|---|---|---|---|---|---|---|---|---|---|
| 28 | 10 | 10 | 10 | 10 | 0 | 0 | 0 | 0 | 0 | 0 | 0 | 0 | 0 | 0 |
| 29 | 10 | 10 | 10 | 10 | 0 | 0 | 0 | 0 | 0 | 0 | 0 | 0 | 0 | 0 |
| 30 | 10 | 10 | — | — | 0 | 0 | 0 | 0 | 0 | 0 | 0 | 0 | 2 | 0 |
| 31 | — | 10 | — | — | 0 | 0 | 0 | 0 | 0 | 0 | 0 | 0 | 0 | 0 |
| 2 | 10 | 10 | 10 | 10 | 0 | 0 | 0 | 5 | 0 | 0 | 0 | 0 | 0 | 0 |
| 32 | 10 | 10 | 10 | 10 | 0 | 0 | 0 | 5 | 0 | 0 | 0 | 0 | 0 | 0 |
| 33 | — | 10 | 10 | — | 0 | 0 | 0 | 0 | 0 | 0 | 0 | 0 | 1 | 0 |
| 1 | — | 10 | 10 | 9 | 0 | 0 | 0 | 0 | 0 | 0 | 0 | 1 | 1 | 0 |
| 34 | — | — | 10 | 9 | 0 | 0 | 0 | 0 | 0 | 0 | 0 | 0 | 0 | 0 |
| 35 | — | 9 | 10 | 9 | 0 | 0 | 0 | 0 | 0 | 0 | 0 | 0 | 3 | 0 |
| 26 | — | 10 | 10 | — | 0 | 0 | 0 | 0 | 0 | 0 | 0 | 0 | 0 | 0 |
| 27 | 10 | 10 | 10 | 10 | 0 | 0 | 0 | 0 | 0 | 0 | 1 | 0 | 1 | 1 |
| 3 | 10 | 10 | 0 | 0 | — | 1 | 3 | 0 | — | 0 | 1 | 0 | — | — |
| 4 | 10 | 10 | 0 | 0 | 2 | 0 | 0 | 0 | 0 | 0 | 0 | 0 | — | 0 |

TABLE II-continued

| Comp'd No. | CA | CO | PE | RI | PL | SM | LA | CC | AR | IP | EC | SI | DS | SF |
|---|---|---|---|---|---|---|---|---|---|---|---|---|---|---|
| 5 | — | 10 | 10 | — | 1 | 0 | 1 | — | 1 | — | 3 | 3 | — | — |
| 6 | — | 10 | 10 | 10 | 0 | 0 | 0 | — | 0 | 1 | 1 | 1 | 1 | 1 |
| 7 | — | 10 | 10 | 10 | 0 | 0 | 0 | 0 | 0 | 0 | 0 | 0 | 0 | 0 |
| 8 | 10 | 10 | 10 | 10 | 0 | 0 | 0 | 3 | 0 | 0 | 0 | 2 | 2 | 2 |
| 9 | — | · | 10 | 10 | 0 | 0 | 0 | 0 | 0 | 0 | 0 | 0 | 0 | 0 |
| 10 | 10 | 10 | 10 | 10 | 1 | 1 | 1 | — | 0 | — | — | — | 3 | 3 |
| 11 | 10 | 10 | 10 | — | 0 | 0 | 0 | 0 | 0 | 0 | 0 | 0 | 0 | 0 |
| 12 | — | 10 | 10 | 10 | 0 | 1 | 0 | — | 1 | 1 | 1 | 2 | 2 | 2 |
| 13 | 10 | 10 | 10 | 10 | 0 | 0 | 0 | 0 | 0 | 0 | 0 | 0 | 0 | 0 |
| 14 | — | 10 | 10 | — | 0 | 0 | 0 | 0 | 0 | 0 | 0 | 0 | 0 | 2 |
| 15 | — | 10 | 10 | — | 0 | 0 | 3 | 0 | 0 | 0 | 0 | 0 | 0 | 0 |
| 16 | — | 10 | 10 | 10 | 0 | 0 | 0 | 0 | 0 | 1 | 0 | 0 | 0 | 0 |
| 17 | — | 10 | 10 | 10 | 0 | 0 | 0 | 0 | 0 | 0 | 0 | 0 | 0 | 0 |
| 18 | — | 10 | 10 | 10 | 0 | 1 | 0 | 0 | 0 | 0 | 0 | 0 | 0 | 0 |
| 19 | — | 10 | 10 | 10 | 0 | 0 | 0 | 0 | 0 | 0 | 0 | 0 | 0 | 0 |
| 20 | 10 | 10 | 10 | 10 | 0 | 0 | 0 | 0 | 0 | 2 | 0 | 0 | 0 | 0 |
| 21 | — | — | 10 | 10 | 0 | 0 | 0 | 0 | 0 | 0 | 0 | 0 | 0 | 0 |
| 22 | — | — | 10 | 10 | 0 | 0 | 0 | 0 | 0 | 0 | 0 | 0 | 0 | 0 |
| 23 | — | 10 | 10 | 10 | 0 | 0 | 0 | 0 | 0 | 0 | 0 | 0 | — | 0 |
| 24 | 10 | 10 | 10 | — | 0 | 0 | 0 | 0 | 0 | 1 | 0 | 0 | 0 | 0 |
| 25 | — | — | 10 | 10 | 0 | — | 4 | — | — | — | — | 2 | — | 2 |
| 37 | — | — | 10 | 10 | 0 | 0 | 0 | 0 | 0 | 0 | 0 | 0 | 0 | 0 |
| 38 | — | — | 10 | 10 | — | — | 0 | 3 | 0 | 0 | — | — | — | — |
| 39 | — | — | 10 | 10 | 1 | — | 0 | 1 | 0 | 0 | — | — | — | — |
| 40 | — | — | 10 | 10 | 0 | 0 | 0 | 0 | 0 | 0 | 0 | 0 | — | — |
| 41 | — | 10 | 10 | 10 | 0 | 0 | 0 | 0 | 0 | 0 | 0 | 0 | 0 | 0 |
| 42 | — | 10 | 10 | 10 | 0 | 0 | 0 | 0 | 0 | 0 | 0 | 0 | 0 | 0 |
| 43 | — | — | 10 | 10 | 0 | 0 | 0 | 0 | 0 | 0 | 0 | 0 | 1 | 0 |
| 44 | — | — | 10 | 4 | 1 | 4 | 0 | 1 | 0 | 2 | — | — | — | — |
| 45 | — | 10 | 10 | 10 | 0 | 3 | 0 | 1 | 0 | 0 | 2 | 4 | — | — |
| 46 | 9 | — | 9 | — | 0 | 0 | 0 | 0 | 0 | 0 | 0 | 0 | 2 | 0 |
| 47 | — | 10 | 10 | 10 | 0 | 0 | 0 | 0 | 0 | 0 | 3 | 1 | — | — |
| 53 | 10 | 10 | 10 | 10 | 0 | 0 | 0 | 0 | 0 | 0 | 4 | 4 | — | — |
| 57 | 10 | — | 10 | 10 | 0 | 0 | 0 | 0 | 0 | 0 | 0 | 0 | 1 | 0 |
| 58 | 10 | 10 | 10 | 10 | 0 | 0 | 0 | 0 | 0 | 0 | 3 | 2 | — | 0 |
| 59 | 10 | 10 | 10 | 10 | 0 | 0 | 0 | 0 | 0 | 0 | — | 1 | — | — |
| 60 | 10 | 10 | 10 | 10 | 1 | 0 | 0 | 2 | 0 | 0 | — | — | — | — |
| 48 | — | 9 | 10 | 10 | 0 | 5 | 0 | — | 0 | 0 | — | — | — | — |
| 49 | — | — | 10 | 10 | 0 | 0 | 0 | 0 | 0 | 0 | 4 | 0 | — | — |
| 50 | 10 | — | 10 | 10 | 0 | 0 | 0 | 3 | 0 | 3 | 0 | 0 | — | — |
| 51 | 10 | — | 10 | 10 | 0 | 0 | 4 | 5 | 0 | 0 | — | — | — | — |
| 52 | 10 | 10 | 10 | 10 | 0 | 1 | 5 | 1 | 0 | 0 | 4 | 2 | — | — |
| 62 | 10 | 9 | 10 | — | 0 | 0 | 0 | 3 | 0 | 2 | 0 | 0 | 0 | 1 |
| 63 | — | — | 9 | 9 | 0 | 0 | 0 | 0 | 0 | 0 | 0 | 0 | 0 | 0 |
| 64 | 10 | 9 | 9 | 8 | 0 | 0 | 0 | 0 | 1 | 1 | 1 | 0 | 0 | 0 |
| 65 | 9 | 10 | 8 | 10 | 0 | 0 | 0 | 0 | 1 | 1 | 3 | 3 | 0 | 1 |
| 66 | — | 10 | 10 | 10 | 1 | 2 | — | 0 | 0 | 0 | 2 | 0 | 0 | 0 |
| 67 | — | — | 9 | 9 | 0 | 0 | 0 | 0 | 0 | 0 | 3 | 0 | 0 | 0 |
| 68 | — | 8 | 10 | 10 | 2 | 0 | 0 | 0 | 0 | 0 | 3 | 0 | 0 | 0 |
| 69 | 9 | 10 | 10 | 10 | — | 1 | 3 | — | 0 | 5 | — | 0 | 0 | — |
| 70 | 10 | 10 | 10 | 10 | 0 | 1 | 0 | 0 | 0 | 2 | 0 | 0 | 0 | 0 |
| 71 | 8 | — | 10 | — | 0 | 0 | 0 | 0 | 0 | 0 | 2 | 0 | 6 | 2 |
| 72 | — | — | 10 | 10 | 0 | 0 | 0 | 0 | 0 | 0 | 2 | 0 | 4 | 1 |
| 73 | 8 | 10 | 10 | 10 | 0 | 3 | 3 | — | 3 | 0 | — | 0 | 5 | 4 |

TABLE III

| Compound No.: | 28 | 29 | 30 | 31 | 34 |
|---|---|---|---|---|---|
| CA | 10 | 10 | 10 | 10 | 10 |
| CO | 10 | 10 | 10 | 10 | 10 |
| PE | 10 | — | — | — | — |
| PO | 10 | — | — | — | — |
| RI | 10 | 10 | — | — | 10 |
| PL | 0 | 0 | 0 | 0 | 0 |
| SM | 0 | 0 | 0 | 0 | 0 |
| LA | 0 | 0 | 0 | 0 | 0 |
| CC | 3 | — | 0 | 0 | 0 |
| AR | 0 | 1 | 0 | 0 | 0 |
| CS | 1 | — | 0 | — | 0 |
| IP | 0 | 0 | 0 | 0 | — |
| EC | 1 | 3 | 1 | 1 | 4 |
| SI | 0 | 4 | 0 | 2 | — |
| DS | 0 | — | 1 | — | — |
| SF | 1 | — | 2 | — | — |

TABLE IV

| Comp'd No. | AS | XP | PR | SV | RE | EI |
|---|---|---|---|---|---|---|
| 28 | 0 | 0 | 0 | 0 | 0.5 | 2 |
| 29 | 0 | 0 | 0 | 0 | 1 | 4 |
| 30 | 0 | 0 | 0 | 0 | 0.5 | 1 |
| 31 | 0 | 0 | 0 | 0 | 1 | 0 |
| 32 | 0 | 0 | 0 | 0 | — | — |
| 33 | 0 | 0 | 0 | 0 | — | — |
| 11 1 | 0 | 0 | 0 | 0 | — | — |

What we claim is:

1. A method for controlling the growth of weeds in a field containing growing plants of cotton which comprises applying to the field a compound of the formula:

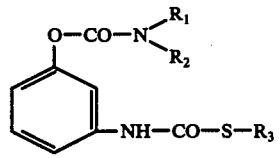

wherein $R_1$ is lower alkyl, allyl, lower haloalkyl; $R_2$ is lower alkyl, allyl, lower haloalkyl, lower alkinyl, cyclohexyl, benzyl, or phenyl-ethyl; $R_3$ is methyl or ethyl, said compound being applied in amounts sufficient to substantially prevent the growth of weeds without damage to cotton plants.

2. The method of claim 1 wherein the compound is applied to said field at a rate of from about 1 to about 10 kilograms per hectare.

3. The method of claim 1 wherein said compound is applied at a rate of from about 1 to about 3 kilograms per hectare.

4. The method of claim 3 wherein $R_1$ is lower alkyl, $R_2$ is selected from the group consisting of benzyl, lower alkyl, phenylethyl, cyclohexyl, and chloroethyl.

* * * * *